(No Model.)

M. BURTON.
ANIMAL TRAP.

No. 498,909. Patented June 6, 1893.

Witnesses:
R. J. Jacker.
E. A. Duggan.

Inventor:
Matthew Burton
By Chas. C. Tillman
Atty.

UNITED STATES PATENT OFFICE.

MATTHEW BURTON, OF CHICAGO, ILLINOIS, ASSIGNOR TO THE GILBERT & BENNETT MANUFACTURING COMPANY, OF GEORGETOWN, CONNECTICUT.

ANIMAL-TRAP.

SPECIFICATION forming part of Letters Patent No. 498,909, dated June 6, 1893.

Application filed December 9, 1892. Serial No. 454,678. (No model.)

*To all whom it may concern:*

Be it known that I, MATTHEW BURTON, a citizen of the United States, residing at Chicago, in the county of Cook and State of Illinois, have invented certain new and useful Improvements in Animal-Traps, of which the following is a specification.

My invention relates to improvements in animal traps, and is more especially adapted to that class of such devices known as rat-traps; and it consists in certain peculiarities of the construction, novel arrangement and operation of the various parts thereof, as will be hereinafter more fully set forth and specifically claimed.

The object of my invention is to provide a simple and inexpensive trap for rats and other animals, which may be more easily baited than those of the ordinary construction, and without the necessity of placing the hand within the interior of the trap or cage.

In order to enable others skilled in the art to which my invention pertains to make and use the same, I will now proceed to describe it, referring to the accompanying drawings, in which—

Figure 1:
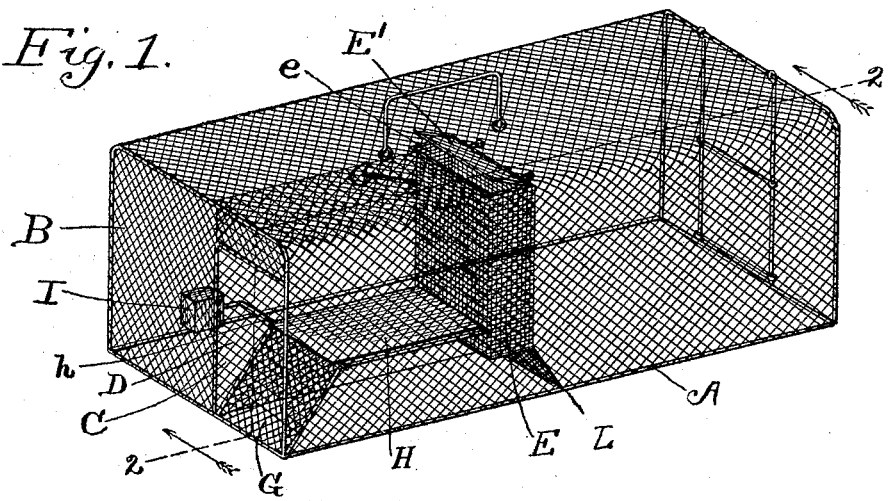
Figure 2:
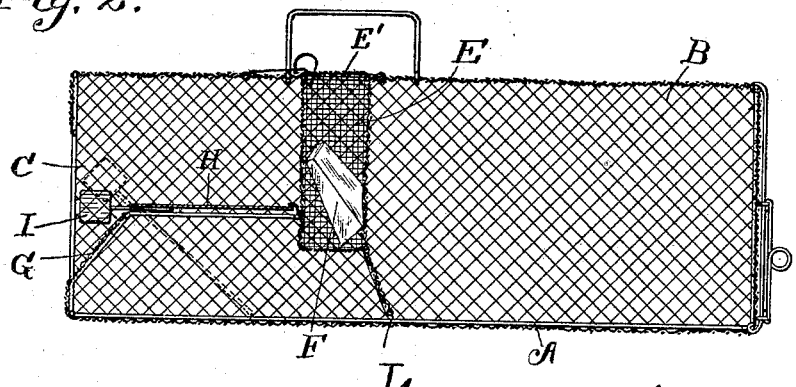
Figure 3:
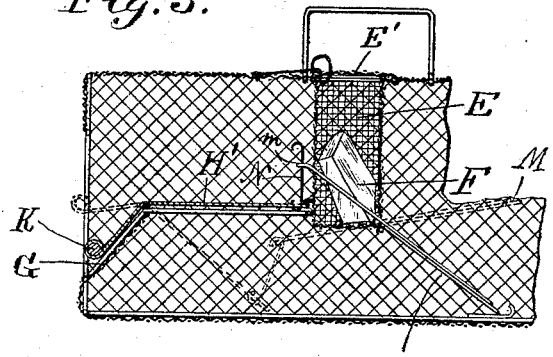
Figure 4:
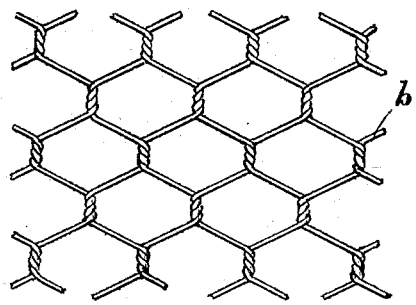

Figure 1, is a perspective view of my trap as it appears when "set" and ready for use, showing the food receptacle or bait-box open and accessible for baiting purposes from the exterior of the cage. Fig. 2, is a longitudinal sectional view, taken on line 2, 2, of Fig. 1, showing the bait-box closed and a piece of food therein. Fig. 3, is a view in side elevation of a portion of the cage or frame, showing a modification in the construction and operation of the teeter or trap door, and Fig. 4, is a view showing in detail the construction of a portion of the wire-work, forming the body of the cage.

Similar letters refer to like parts throughout the different views of the drawings.

A, represents the main or supporting frame, which may be made of any suitable size, form and material but preferably of metallic rods, bent so as to form a quadrilateral floor and rectangular ends. Around this frame is placed and secured in any desired manner wire-work b, which forms the cage B, the front portion of which near one of the sides of the cage is provided with an opening C, through which the animals may enter the cage. Extending from the top of the cage to the bottom thereof, and from its front end rearward to a suitable point, is placed a partition D, which together with one of the sides of the cage, forms a narrow passage for the entrance of the animals on their way to the food receptacle or bait-box E, which is placed within the cage at the end of said passage, and is preferably made of wire netting, and as shown in the drawings extends from the top of the cage to near its bottom.

As is clearly seen in Fig. 1, the bait-box E, is provided with a hinged door E', which closes its upper part which opens into and unites with an opening e, in the top of the cage. It will therefore be understood that the article of food or bait F, may be placed within and removed from the box E, without placing the hand within the cage.

The lower portion of the opening C, or the front part of the passage is provided with an inclined floor G, which extends from the side of the cage to the partition and some distance upward within the entrance or passage-way. Just above the inclined floor G, and within the passage-way is placed a trap-door or teeter H, which normally lies in a horizontal position, and has its outer end secured to a rod h, which rod has its bearings in the partition C, and the side of the cage. As shown in Fig. 1, this rod passes through the partition C, into the cage and has its free end bent at substantially a right angle with the trap-door H, and has secured thereon a weight I, which counter-balances the weight of the trap-door, yet allows the same to be pressed down by the weight of the animal as it enters the passage-way to the bait-box, when it and the weight will assume the position indicated by dotted lines in Fig. 2.

In Fig. 3, I have shown a modification of the trap-door, which consists in forming the door H', with its outer portion extended and bent downward over the inclined floor G. This door is provided at its lower outer portion with a weight K, to counter-balance its horizontal portion after it has been tipped by the weight of the animal.

While I may make the body of the cage of any suitable material, yet I prefer on account of its cheapness to use twisted wire netting for this purpose, a section of which is illustrated in Fig. 4, in detail.

By reference to the drawings it will be seen that the bait-box E, is joined to and forms part of the inner end of the partition D, and closes the inner portion of the passage-way, and that the partition D, which extends from the top to the bottom of the cage also extends longitudinally from the opening C, to the farther side of the bait-box from said opening.

As it often occurs when a number of rats have been caught in the trap, that one of them will get under the trap-door H, and prevent it from tilting when another one attempts to enter, I hinge to the lower portion of the bait-box and preferably to its rear side a door L, which by reason of its gravity hangs down as shown in the drawings, and closes the end of the passage beneath the bait-box, yet by a slight pressure will yield and allow the rat to pass out into the cage, when the door will again assume its normal position and prevent the rat going under the trap-door, as is apparent.

In order to more effectually obviate the above named difficulty or objection, and at the same time to offer no obstacle or impediment to the entrance of the animal, after the trap-door has been tipped, I sometimes secure to the door L, an arm M, which extends alongside of the bait-box to a slight distance above the trap-door, and has its free end formed with a hook or ring m, to engage with an arm N, which is secured to the trap-door and extends vertically as shown in Fig. 3. When this construction is employed, the weight of the animal on the trap-door will depress it and by reason of its connections with the door L, will cause the latter named door to rise as the trap-door is lowered, and the parts to assume the positions indicated by dotted lines in Fig. 3, when the rat may pass from the passage-way into the main cage and be prevented from returning by the door L, which by reason of its gravity will again assume the position indicated by continuous lines in the last named figure.

It is evident that I may employ either of the weights I, or K, with the trap door when it is connected with the door L, as above described. It is also apparent that the upper portion of the inner end of the passage-way may be closed by an ordinary partition, and the bait-box placed at any point within the cage, or it may be omitted without affecting the operation and functions of the doors.

Having thus fully described my invention, what I claim as new, and desire to secure by Letters Patent, is—

1. In an animal trap the combination of the cage B, having a passage-way C, provided with a weighted trap-door, with a bait-box or food receptacle E, placed within the cage and at the inner end of the passage-way and forming a part thereof, and having an exterior opening, substantially as set forth.

2. In an animal trap the combination of the cage B, having the passage-way C, provided with a trap, with the bait-box or food receptacle E, placed within the cage and at the inner end of the passage-way and forming a part thereof, and having an exterior opening and a door L, hinged at the lower part of the bait-box, substantially as and for the purpose set forth.

3. In an animal trap, the combination of the cage B, having the passage-way C, provided with a trap-door, having an upright arm, with the bait-box or food receptacle placed within the cage and at the inner end of the passage-way and forming a part thereof, and having an exterior opening, and a door L, hinged near the lower part of the bait-box, and having the arm M, engaging with the upright arm on the trap-door, substantially as and for the purpose set forth.

4. In an animal trap, the combination of the cage B, having the passage-way C, provided with a trap-door having an upright arm, with the door L, located in the passage-way, and having the arm M, engaging with the upright arm on the trap-door, substantially as described.

MATTHEW BURTON.

Witnesses:
CHAS. C. TILLMAN,
E. A. DUGGAN.